US 6,599,431 B2
Jul. 29, 2003

(12) United States Patent
Kawaguchi et al.

(10) Patent No.: US 6,599,431 B2
(45) Date of Patent: Jul. 29, 2003

(54) PURIFYING APPARATUS FOR CONTAMINATED WATER AND GROUND WATER AND METHOD THEREOF

(75) Inventors: Masahiro Kawaguchi, Kanagawa (JP); Kinya Kato, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/880,761

(22) Filed: Jun. 15, 2001

(65) Prior Publication Data

US 2002/0036174 A1 Mar. 28, 2002

(30) Foreign Application Priority Data

Jun. 16, 2000 (JP) .................................. 2000-181840
Dec. 20, 2000 (JP) .................................. 2000-386970

(51) Int. Cl.$^7$ .................................................. C02F 1/30
(52) U.S. Cl. ........................ 210/748; 210/806; 210/150; 210/188; 210/192; 210/218; 204/554; 204/232
(58) Field of Search ................. 210/748, 691, 210/806, 150, 188, 192, 218, 170; 204/554, 232

(56) References Cited

U.S. PATENT DOCUMENTS

| 3,649,493 A | 3/1972 | Meiners et al. ........... 204/157.1 |
| 4,236,992 A | 12/1980 | Themy ..................... 204/278 |
| 4,361,471 A | 11/1982 | Kosarek ................... 204/128 |
| 4,555,323 A | 11/1985 | Collier ..................... 204/258 |
| 5,039,383 A | 8/1991 | Spotnitz et al. ............ 204/128 |
| 5,260,036 A | 11/1993 | Weigold et al. ........... 422/186.3 |
| 5,460,792 A | 10/1995 | Rosenbaum ............... 423/245.3 |
| 5,490,941 A | 2/1996 | Miyabe et al. ............. 210/673 |
| 5,616,234 A | 4/1997 | Rhees et al. ............... 205/500 |
| 5,714,665 A | 2/1998 | Ohtake et al. ............. 588/204 |
| 5,832,361 A | 11/1998 | Foret ....................... 422/186 |
| 6,238,628 B1 | 5/2001 | Matsutani ................. 422/172 |

FOREIGN PATENT DOCUMENTS

| EP | 605882 A1 | 12/1993 |
| JP | 49-100846 | 9/1974 |
| JP | 54-66376 | 5/1979 |
| JP | 1-180293 | 7/1989 |
| JP | 6-31135 | 2/1994 |
| JP | 8-243351 | 9/1996 |
| JP | 9-299753 | 11/1997 |
| JP | 10-180040 | 7/1998 |
| WO | WO 94/03399 | 2/1994 |

*Primary Examiner*—Betsey Morrison Hoey
(74) *Attorney, Agent, or Firm*—Fitzpatrick, Cella, Harper & Scinto

(57) ABSTRACT

A method and an apparatus for purifying water including groundwater contaminated with a pollutant such as organohalogenated compounds are provided. The contaminated water is purified by aeration to expel the pollutant into gas phase, and the pollutant containing gas is then mixed with a chlorine-containing gas under light irradiation to decompose the pollutant, where the chlorine-containing gas may generated from functional water by aeration.

43 Claims, 6 Drawing Sheets

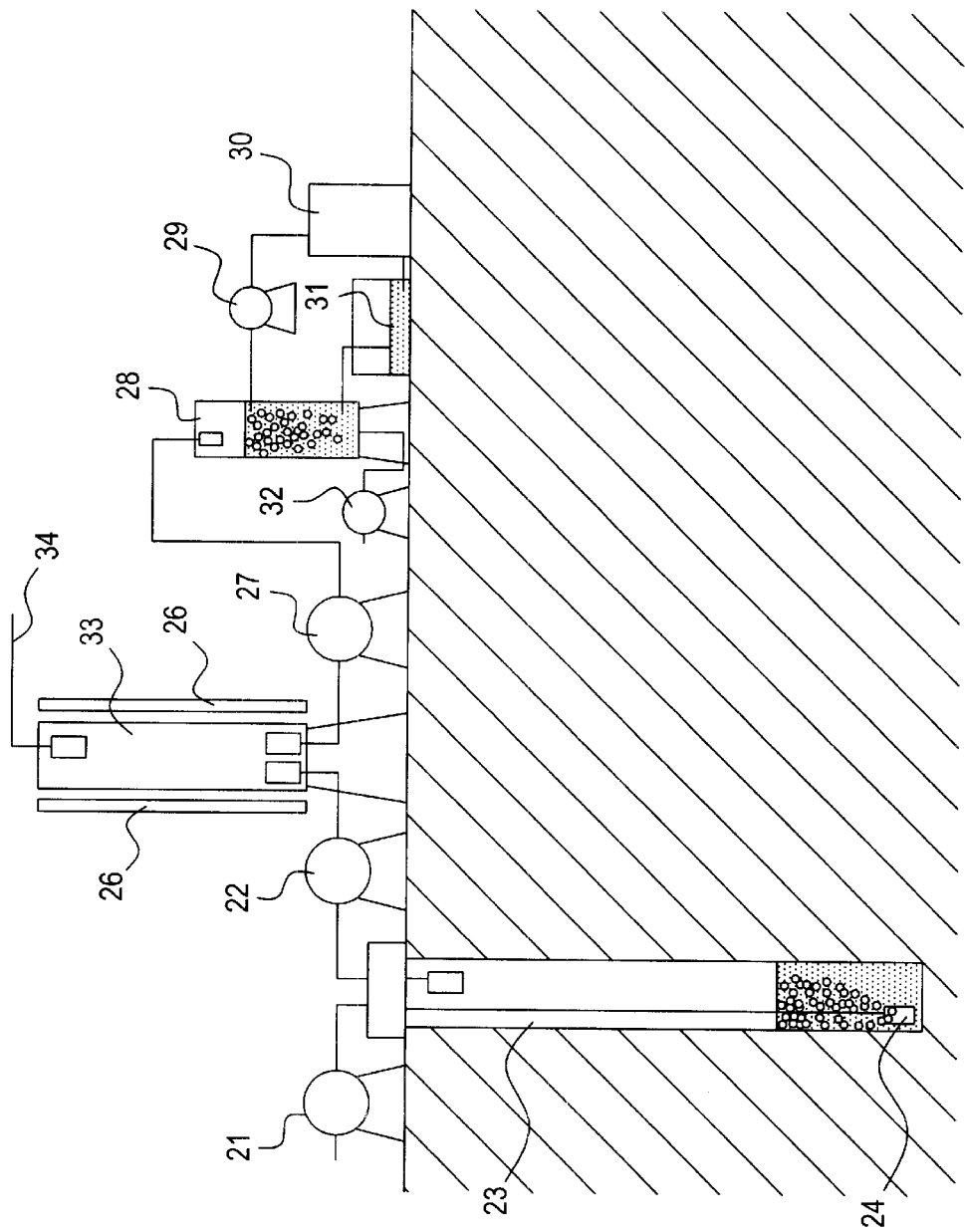

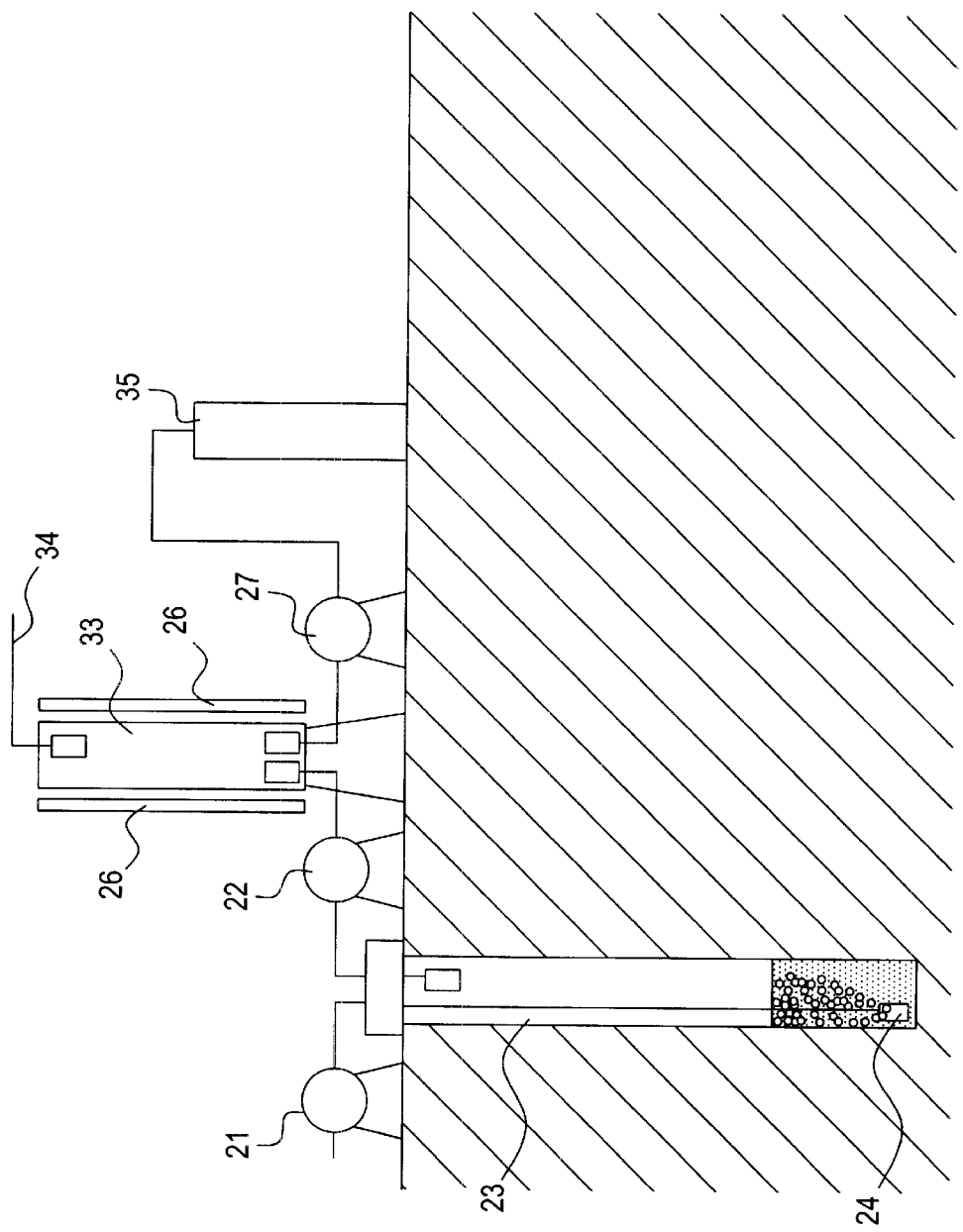

PURIFYING APPARATUS FOR CONTAMINATED WATER AND GROUND WATER AND METHOD THEREOF

BACKGROUND OF THE INVENTION

1. Field of the Invention

The present invention relates to an apparatus for purifying contaminated water or contaminated ground water and to a method of effectively purifying contaminated water or contaminated ground water by using the apparatus.

2. Related Background Art

With the recent advances in industrial technologies, a large amount of halogenated aliphatic hydrocarbon compounds (for example, chlorinated ethylene, chlorinated methane and others) have been used and their disposal and treatment have become a serious problem. Most of the environmental pollutants derived from chlorinated organic compounds will permeate into soil without decomposition and gradually dissolve in ground water to expand the contaminated area through ground water. Thus, it is strongly desired to establish a technology for purifying the contaminated environment to return it to the original state, in addition to never cause such serious pollution again.

In one method to purify ground water, the contaminated ground water is pumped up and purified on-site, by aerating the drawn ground water in an aeration tower to pass the pollutant into the gas phase. The pollutant in the gas phase is removed by an activated carbon column not to cause air pollution by directly releasing the gas into the air.

Purification methods utilizing degradation activities of microorganisms, i.e., bioremediation, have bean also proposed to purify ground water.

In connection with another purification method, Japanese Patent Application Laid-Open No. 54-66376 discloses an apparatus where a halide solution of NaCl or NaBr is electrolyzed in an electrolytic bath, and the original gas containing a malodorous component is passed through the catholyte and then through the anolyte to remove the smell. With such an apparatus, however, malodorous gas may not be treated steadily, because it includes three steps of aeration in the anolyte, recovery of the gas, and aeration in the catholyte in the process.

Japanese Patent Publication No. 53-17816 discloses a method of treating an organic waste liquid, where aluminum chloride or iron chloride is dissolved in the organic waste solution and the chloride is electrolyzed under UV irradiation. According to the specification, hypochlorous acid is generated from the electrolyzed chloride and the organic compounds in the waste are decomposed by active oxygen generated from hypochlorous acid by UV irradiation.

This method also might not achieve a steady treatment, since the chloride compound concentration in the waste will vary.

It is also known that a functional water can be obtained by electrolyzing water. For example, acidic electrolyzed water has sterilizing properties (Japanese Patent Application Laid-Open No. 1-180293) or can cleanse contaminants on semiconductor wafers (EP 605882A).

Photodecomposition is also known. For example, Japanese Patent Application Laid-Open No. 9-299753 and No. 10-180040 disclose a photodecomposition apparatus utilizing a phenomenon that UV-B, and C can decompose certain pollutants.

SUMMARY OF THE INVENTION

The object of the present invention is to provide an apparatus that can effectively purify contaminated water including ground water, without secondary pollution problems, and not requiring activated carbon or microorganisms. Another object of the present invention is to provide a purification method using the apparatus.

One aspect of the present invention is an apparatus for purifying contaminated water such as ground water.

According to one aspect of the present invention, there is provided a purifying apparatus for water containing a pollutant comprising:

an aerator in which a contaminated water containing a pollutant is aerated with a gas to generate a gas containing the pollutant;

a chlorine-containing gas generator that generates a chlorine-containing gas;

a mixing section where the pollutant-containing gas generated from the contaminated water and the chlorine-containing gas generated in the chlorine-containing gas generator are mixed; and light-irradiation means for irradiating the mixed gas with light to decompose the pollutant contained in the mixed gas.

The purification apparatus for contaminated water of the present invention is desirably constituted so that the aerator is in a well.

The chlorine-containing gas generator that generates a chlorine-containing gas includes, in addition to a chlorine cylinder, aerators to aerate a functional water that generates chlorine-containing gas by aeration. Specifically, an aerator to blow air to the surface of the functional water, a jet device to contacting the spray of functional water from a nozzle into contact with air, or a bubbler can be preferably used.

The chlorine-containing gas generator may comprise a water tank, means for generating functional water, means for introducing air into the water tank, means for discharging a chlorine-containing gas generated, and means for discharging the functional water used for generating a chlorine-containing gas.

The means for generating functional water may comprise a water tank, means for feeding an electrolyte-containing water into the water tank, and a pair of electrodes and a power source to apply an electric potential to the electrolyte-containing water in the water tank.

According to another aspect of the present invention, there is provided a method for purifying contaminated water comprising the steps of:

obtaining a pollutant-containing gas by aerating a contaminated water containing a pollutant;

obtaining a chlorine-containing gas;

mixing the pollutant-containing gas and the chlorine-containing gas to form a mixed gas;

decomposing the pollutant in the mixed gas by irradiating with light the mixed gas introduced into a treatment region in a treatment tank: and discharging the mixed gas after decomposition treatment from the treatment region.

BRIEF DESCRIPTION OF THE DRAWINGS

FIG. 5 schematically illustrates an apparatus for purifying contaminated ground water, being an embodiment of the present invention; and FIG. 6 schematically illustrates an apparatus for purifying contaminated ground water, being an embodiment of the present invention.

DETAILED DESCRIPTION OF THE PREFERRED EMBODIMENTS

Now the present invention is described in detail.

The apparatus for purifying contaminated water according to the present invention aerates contaminated water such as polluted ground water (hereinafter, merely referred to as "contaminated water") with a gas such as air to generate pollutant-containing air. The apparatus also generates a chlorine-containing gas. The pollutant-containing air and the chlorine-containing gas are mixed before or after they were introduced into the treatment tank and irradiated with light to decompose the pollutant (hereinafter the pollutant refers to one or more pollutants decomposable in the present invention). Thus, the purifying apparatus of the present invention can efficiently remove the pollutant such as trichloroethylene from contaminated water and decompose it. Pollutants such as trichloroethylene are now causing serious problems because of their harmful nature.

By using the apparatus of the invention, the pollutant removed from the contaminated water is finally decomposed, and the contaminated water is purified. Thus, the purification process is completed.

Figure 1:
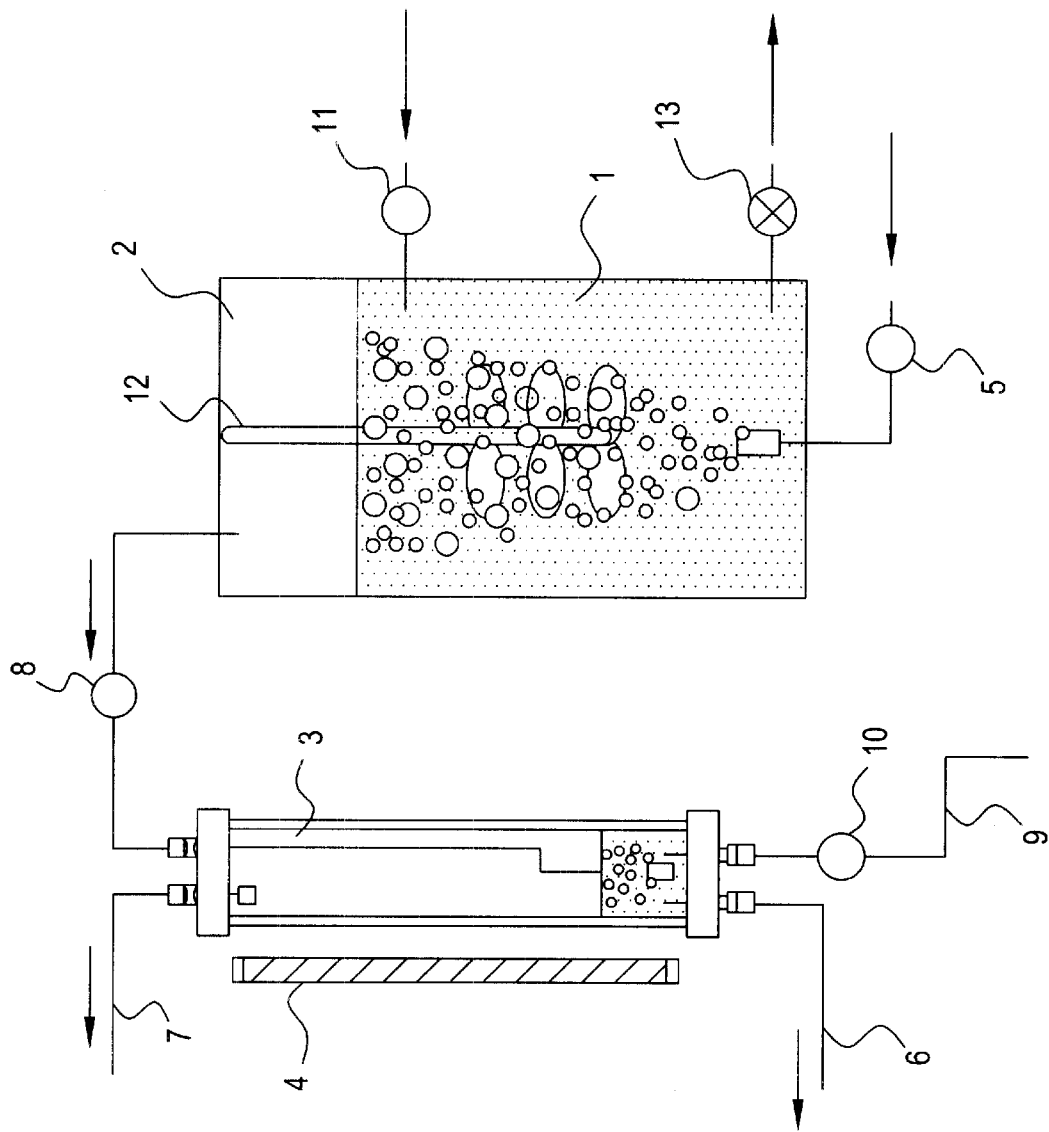
FIG. 1 schematically illustrates a purifying apparatus for contaminated water or ground water, being an embodiment of the present invention.

FIG. 1 schematically illustrates an apparatus for purifying contaminated water according to one embodiment of the invention. Here, contaminated water includes ground water contaminated with halogenated aliphatic compounds such as organochlorinated compounds. In this purifying apparatus, the pollutant is set free from contaminated water and decomposed. This apparatus comprises an aeration tank 2, a treatment tank 3 and light irradiation means 4. Contaminated water 1 to be treated is contained in the aeration tank 2, and aerated to discharge a gas containing the pollutant in it. Chlorine-containing water is aerated with the gas discharged from the aeration tank 2 to supply chlorine to the gas. Then the gas containing the pollutant and chlorine is irradiated with light in the treating tank 3 by using light-irradiation means 4.

Here, the aeration tank 2 is constituted in such a manner that contaminated water can be fed thereto. The tank 2 may be provided with stirring means 12 to efficiently aerate contaminated water 1.

In this purifying apparatus, contaminated water 1 is purified as follows: the water 1 is put into the aeration tank 2 and a gas such as air is sent by a pump 5 into the water 1 to set free the pollutant from water 1. This step is called the aeration step.

The pollutant-containing gas discharged from the aeration step is led into the treatment tank 3 by a pump 8 and passed through chlorine-containing water (functional water).

Into the treatment tank 3, functional water is fed from a feeding unit of functional water (not shown in the figure) through a pipe 9 by a pump 10. Then, the pollutant-containing gas from the aeration tank 2 is passed through the functional water to be added with chlorine. The gas containing both pollutant and chlorine is photo-irradiated by using a lump as the light-irradiation means 4 and the pollutant is decomposed. This step is called purification and decomposition step.

The functional water used in the treatment is discharged through a discharge pipe 6, and the purified gas is discharged from a discharge pipe 7. Numeral 12 denotes stirring means for stirring contaminated water 1.

Further, a means for bringing the gas discharged from the discharge pipe 7 in contact with an adsorption material like activated carbon may be provided to adsorb any undecomposed pollutant. Alternatively, the constitution may such that the gas from the aeration tank 3 is once adsorbed and concentrated on the adsorption material such as activated carbon, and then the gas released from the adsorption material is introduced into the treatment tank 3.

Figure 2:
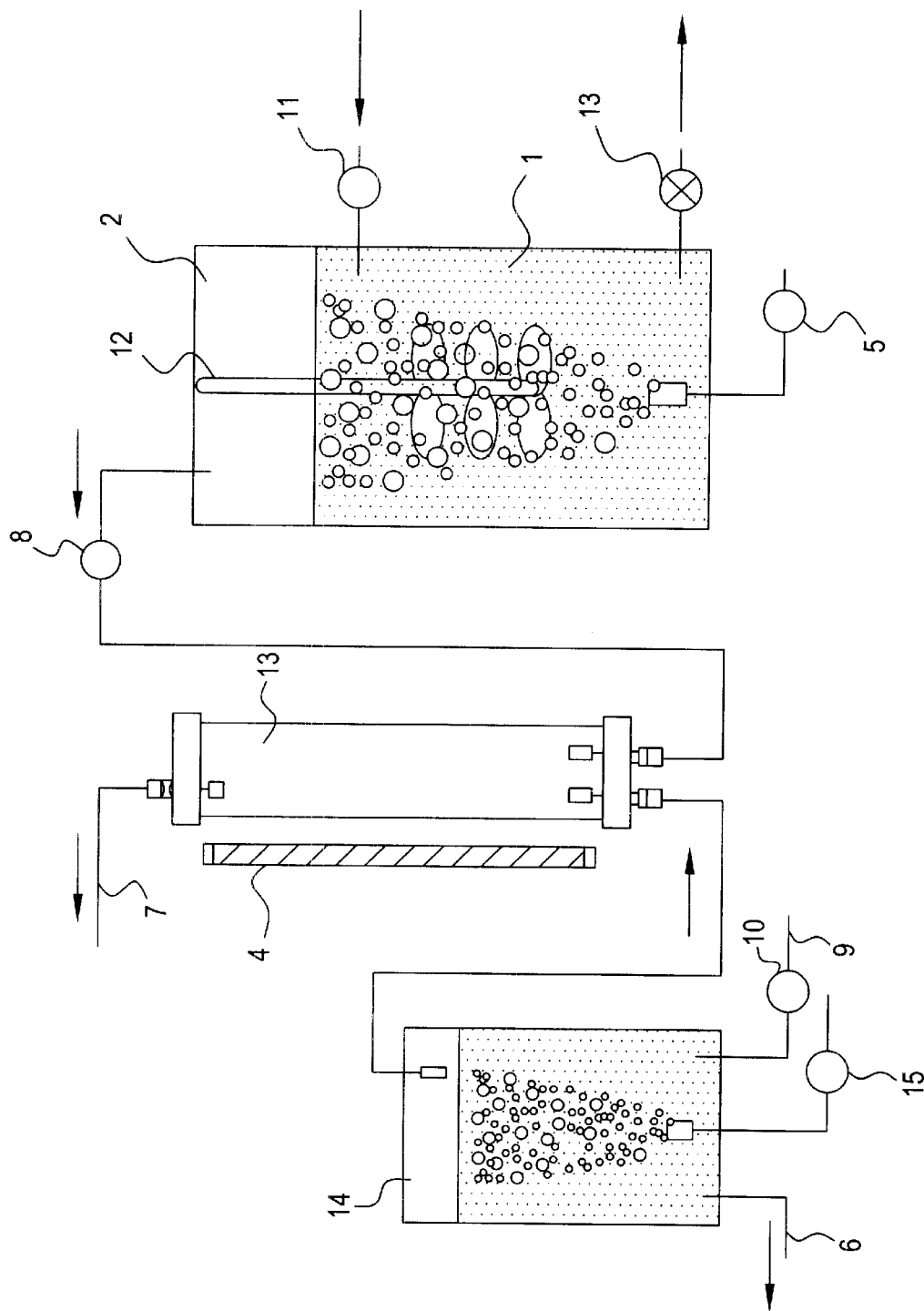
FIG. 2 schematically illustrates a purifying apparatus of another embodiment of the present invention.

FIG. 2 schematically illustrates an apparatus for purifying contaminated water according to one embodiment of the invention. Here, contaminated water includes ground water contaminated with halogenated aliphatic compounds such as organochlorinated compounds. In this purifying apparatus, the pollutant is removed from contaminated water and decomposed. This apparatus comprises an aeration tank 2, a functional water aeration tank (herein after referred to as FW aeration tank) 14, a treatment tank 3 and light irradiation means 4. Contaminated water 1 to be treated is contained in the aeration tank 2, and aerated to discharge a gas containing the pollutant in it. In the FW aeration tank, chlorine-containing water is aerated to generate a chlorine-containing gas. Then the gas containing the pollutant and the gas containing chlorine is mixed and irradiated with light in the treating tank 3 by using light-irradiation means 4.

Here, the aeration tank 2 is constituted in such a manner that contaminated water can be fed thereto. The tank 2 may be provided with stirring means 12 to efficiently aerate contaminated water 1.

In this purifying apparatus, contaminated water 1 is purified as follows: the water 1 is put into the aeration tank 2 and a gas such as air is sent by a pump 5 into the water 1 to free the pollutant from water 1. This step is called the aeration step.

Next, a pollutant-containing gas is led into the treatment tank 3 with the use of the pump 8, and at the same time, a chlorine-containing gas produced by passing through functional water in the FW aeration tank 14 is introduced into the treatment tank 3.

Functional water is fed into the FW aeration tank 14 from a functional water production device (not shown in the figure) through a pipe 9 and a pump 10. In the treatment tank 3, light-irradiation is carried out by using a lamp as the light-irradiation means 4 to decompose the pollutant in the mixed gas. This process is referred to as a purification and decomposition step. The functional water used in the FW aeration tank 14 is discharged through a discharge pipe 6, and purified gas is discharged from a discharged pipe 7.

Further, a means for bringing the gas discharged from the discharge pipe 7 in contact with an adsorption material like activated carbon may be provided to adsorb any undecomposed pollutant. Alternatively, the constitution may such that the gas from the aeration tank 3 is once adsorbed and concentrated on the adsorption material such as activated carbon, and then the gas released from the adsorption material is introduced into the treatment tank 3.

In the aeration step, in addition to stirring by the stirring means, heating by using a heater etc. can accelerate gasification of the pollutant.

Figure 3:
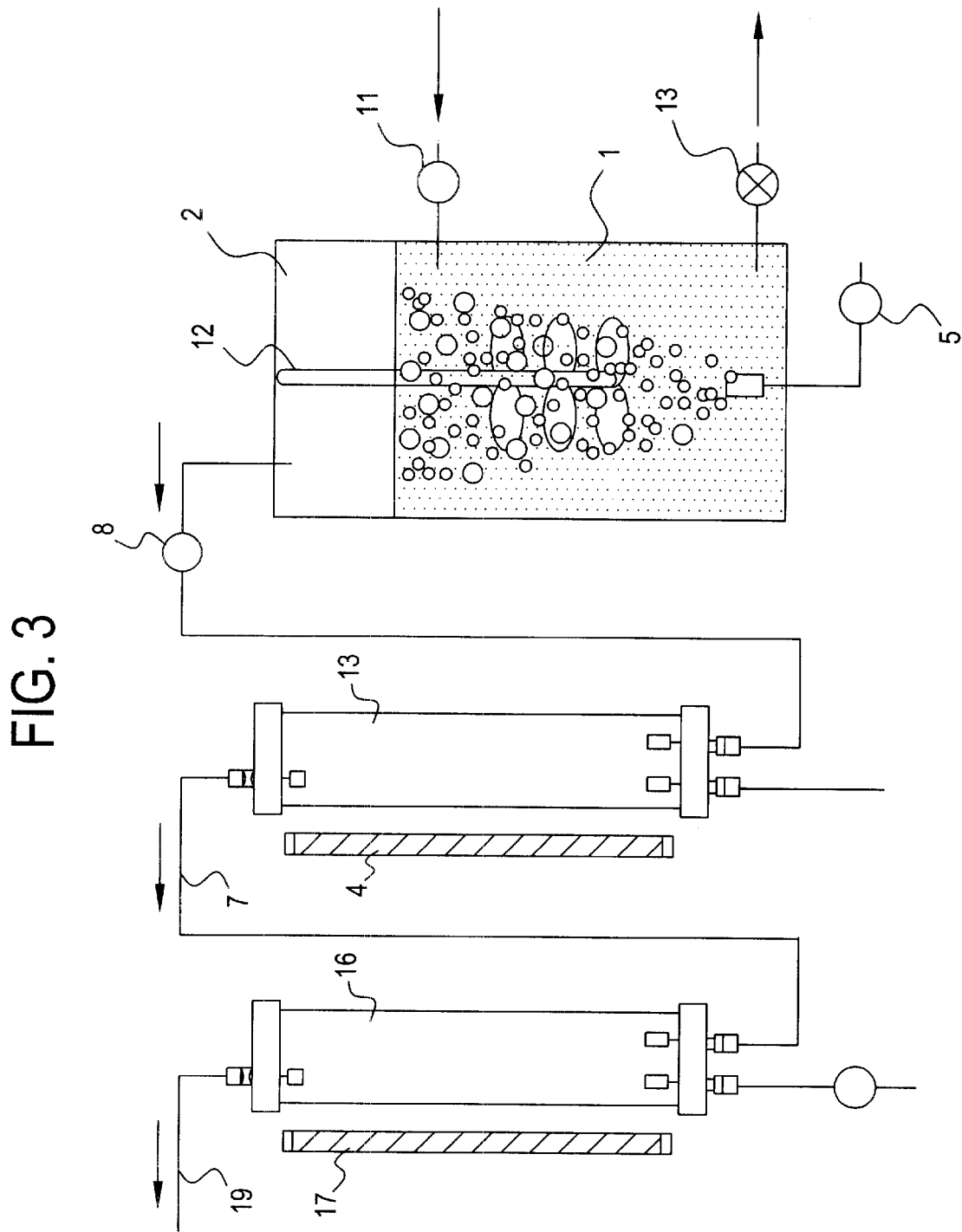
FIG. 3 schematically illustrates a purifying apparatus of still another embodiment of the present invention.

Moreover, in a configuration shown in FIG. 3, a second treatment tank 16 is provided for occasions when the pollutant still remains in the gas discharged from an discharge pipe 7 after the treatment. When chlorine gas remains in an amount sufficient for the second treatment in the gas discharged from the discharge pipe 7, the residual pollutant can be decomposed in a second treatment tank 16 by light-irradiation using light-irradiation means 17. When the residual amount of chlorine gas in the discharged gas is insufficient for the second treatment, chlorine-containing air is fed from the FW aeration tank 14 (not shown in the figure) into the second treatment tank 16 by a pump 18, and then, the residual pollutant can be decomposed by light-irradiation.

Figure 4:
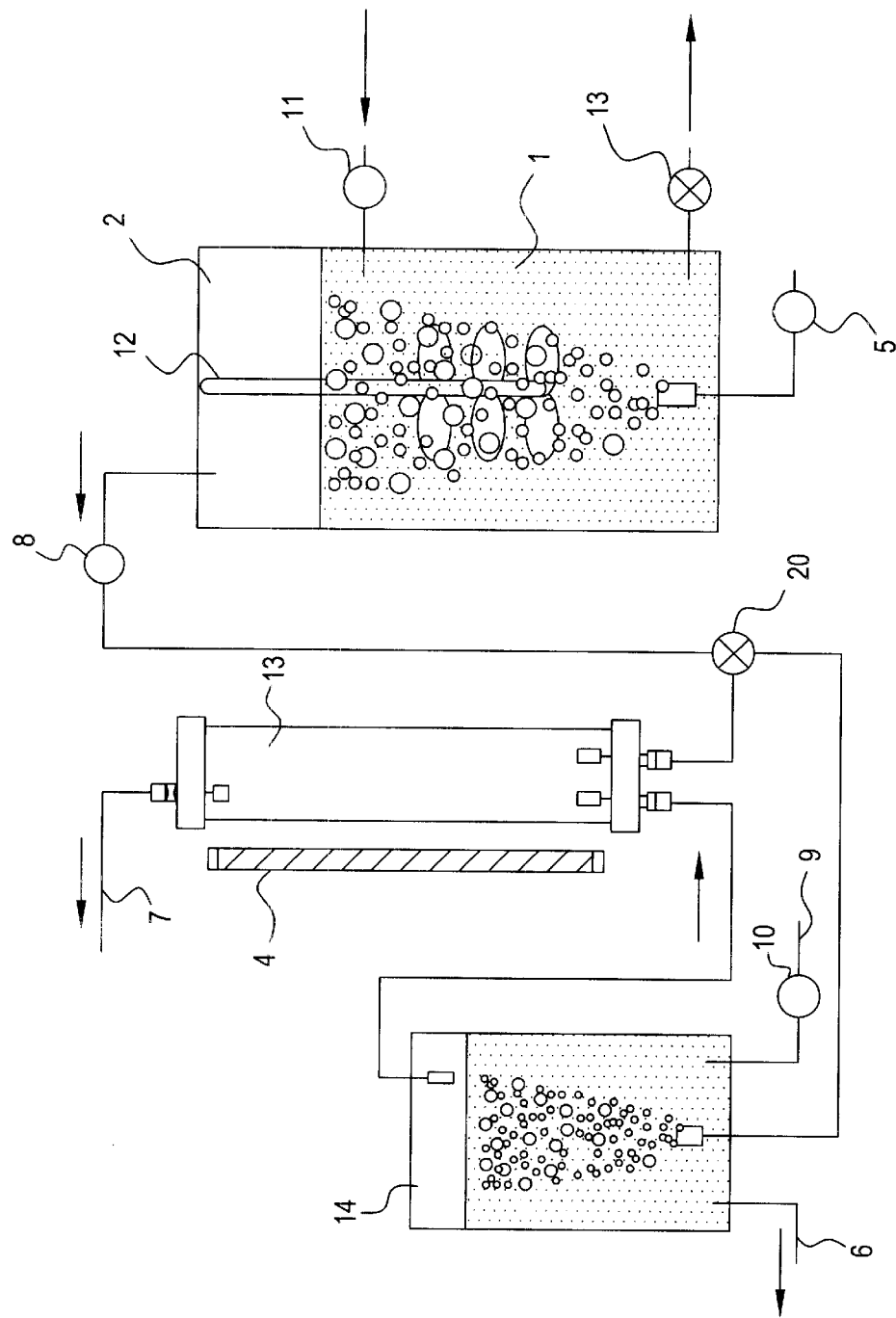
FIG. 4 schematically illustrates a purifying apparatus of still another embodiment of the present invention.

In the embodiment shown in FIG. 4, part of the pollutant-containing gas obtained by aerating contaminated water is used for aerating functional water to generate a chlorine-containing gas. The pollutant-containing gas is divided into two by a valve 20, one is introduced into the treatment tank 3 and the other into the FW aeration tank 14.

The gas introduced into the FW aeration tank 14 receives chlorine from the functional water during passing through the functional water to become a chlorine-containing gas, and then the gas is introduced into the treatment tank 3 to be mixed with the pollutant-containing gas that is directly introduced into the treatment tank 3 via the valve 20. The pollutant is decomposed by irradiation of the mixed gas with light by using the light-irradiation means 4. Thus, contaminated water is purified.

FIG. 5 illustrates an embodiment of the invention, an apparatus for purifying ground water in a well dug into the soil. In the apparatus shown in FIG. 5, the ground water that flows out in the well 23 is purified.

First, the ground water that flowed out in the well 23 is aerated by a blower 21 to pass the pollutant into the gas phase. The pollutant-containing air is introduced into a treatment tank 33 by a pump 22. Meanwhile, functional water prepared by a functional water production device 30 is introduced into a FW aeration tank 28, into which air is blown from a blower 32. Chlorine-containing gas obtained by aeration of functional water is introduced into a treatment tank 33 through a pump 27 and is mixed with the pollutant-containing air.

The mixed gas is irradiated with light by light-irradiation means 26 to decompose the pollutant and is then discharged from a discharge pipe 34.

As the light-irradiation means 26 a black light may be used, for example. The purified air from the discharge pipe 34 may be discharged as it is when the pollutant concentration is not over the prescribed limit, or it may be led into an adsorption column of activated carbon.

In the configuration shown in FIG. 5, chlorine-containing gas obtained by the aeration of functional water in an FW aeration tank 28 is introduced into a treatment tank 33 to be mixed with pollutant-containing air and then the mixed gas is subjected to decomposition. Alternatively, FIG. 6 shows a configuration in which pollutant-containing air is mixed with chlorine from a chlorine gas cylinder being a chlorine supplying device 35 to decompose the pollutant in the mixed gas.

The process after the mixing of chlorine gas from a chlorine gas cylinder is the same as shown in FIG. 5.

In the following, a more detailed description is provided.
<Contaminated Water to be Treated>

Contaminated water, including contaminated ground water, to be treated in the present invention, is not specifically limited. Subject pollutants to be treated in the present invention are those decomposable by functional water and light, such as halogenated aliphatic hydrocarbon compounds. The halogenated aliphatic hydrocarbon compounds include those having at least one of chlorine and fluorine atoms, especially, chlorinated organic compounds. Chlorinated organic compounds include chloroethylene, 1,1-dichloroethylene, cis-1,2-dichloroethylene, trans-1,2-dichloroethylene, trichloroethylene, 1,1,1-trichloroethane, tetrachloroethylene, chloromethane, dichloromethane, trichloromethane and the like.

The present invention is suitable for treating pollutants that are highly volatile and can easily pass into gas phase from contaminated water by aeration, etc.

In addition to the ground water contaminated by the above-described pollutants, the present invention can also be used to purify desorption water that is produced when a gas containing any of the above described pollutants is treated by activated carbon and the adsorbed pollutants are desorbed by steam desorption or the like.

Contaminated water of any pollutant concentration may be used in the present invention, that is, contaminated water of a pollutant concentration from as low as 1 mg/L or less to as high as 100%, almost neat, can be treated.
<Functional Water Generation Unit and Functional Water>

Functional water, which can be used in the present invention and can generate a chlorine-containing gas by aeration, is a chlorine solution having the following properties. Such a solution is called electrolyzed water or electrolyzed functional water and is being used for the purpose of sterilization. Functional water as used herein refers to water having a pH between 1 and 4 and a residual chlorine concentration between 5 mg/liter and 150 mg/liter, preferably between 30 mg/liter and 120 mg/liter. Preferably, the functional water has an oxidation-reduction potential between 800 mV and 1,500 mV when measured by using platinum and silver-silver chloride as the working and the reference electrodes, respectively.

Functional water can be obtained near the anode when an electrolyte (e.g. sodium chloride or potassium chloride) is dissolved into the source water and the solution is electrolyzed in a water tank provided with a pair of electrodes.

For preparing functional water having the above properties, the concentration of the electrolyte, e.g., sodium chloride, in the source water before the electrolysis is preferably between 20 mg/L and 2,000 mg/L.

Undesired mixing of the acidic functional water produced around the anode and the alkaline water produced around the cathode can be prevented by providing a diaphragm between the paired electrodes.

Such a diaphragm may suitably be an ion exchange membrane. To obtain such functional water, any commercially available strongly acidic electrolytic water generator (e.g., OASYS Bio HALF: trade name, a product of Asahi Glass Engineering, or Strong Electrolytic Water Generator Model FW-200: trade name, a product of Amano) may be used.

Functional water having above properties can be prepared by using reagents such as sodium hypochlorous acid. For example, an aqueous solution containing 0.001 to 0.1 mol/l hydrochloric acid, 0.005 to 0.02 mol/l sodium chloride and 0.0001 to 0.1 mol/l sodium hypochlorite can be used as a functional water.

Also, functional water of a pH not higher than 4.0 and of a chlorine concentration 2 mg/L to 2000 mg/L may be prepared from hydrochloric acid and sodium hypochlorite. For example, a solution containing 0.001 to 0.1 mol/l hydrochloric acid and 0.0001 to 0.01 mol/l sodium hypochlorite.

Hydrochloric acid may be replaced by some other inorganic acid or by an organic acid. Inorganic acids that can be used for the purpose of the invention include hydrofluoric acid, sulfuric acid, phosphoric acid and boric acid, whereas organic acids that can be used for the purpose of the invention include acetic acid, formic acid, malic acid, citric acid and oxalic acid. A commercially available weak acidic functional water-generating powder (e.g., Kino-san 21X: trade name, a product of Clean Chemical) typically containing $N_3C_3O_3NaCl_2$ may also be used for preparing functional water.

Functional water produced by an electrolysis apparatus without a diaphragm is also used for decomposing organochlorinated compounds. For example. electrolyzed water having a redox potential not lower than 300 mV and not higher than 1100 mV, and a chlorine concentration not lower than 2 mg/L, and pH 4 to 10 can be used.

Functional water of a pH higher than 4 can be prepared not only by electrolysis but also by dissolving various reagents into source water. For example, desired chlorine-containing water can be obtained by dissolving hydrochloric acid to 0.001 to 0.1 mol/l, sodium hydroxide to 0.001 to 0.1 mol/l and sodium hypochlorite to 0.0001 to 0.01 mol/l.

Alternatively, chlorine-containing water of a pH not lower than 4 and of a chlorine concentration not higher than 1000 mol/l can be obtained by using hypochlorite singly, for example, by dissolving sodium hypochlorite to 0.0001 to 0.01 mol/l.

The above description of functional water is for a configuration mainly shown in FIG. 1, where a means for generating chlorine-containing air comprises an aeration tank containing chlorine-containing water (functional water) in it and aeration means to aerate air containing the pollutant into it, and this aeration means also works as a mixing means of the chlorine-containing air and the pollutant-containing gas.

As described later, in the present invention, it is desirable that chlorine is present in a certain concentration range in the site of the decomposition, and as long as this concentration range is fulfilled, the chlorine concentration in the functional water in the means for generating chlorine-containing air is not necessarily in the above-described range.

For example, as shown in FIG. 2, when air containing no pollutant is introduced in functional water and then generated chlorine gas and pollutant-containing air are mixed, it is desirable to increase the chlorine concentration in the functional water. That is, in such a constitution as shown in FIG. 2, the generated chlorine gas is diluted with pollutant-containing air. The dilution degree depends upon the ratio of the amounts of generated chlorine gas and the pollutant-containing air introduced into the reaction site. For example, if the pollutant-containing air is introduced 4 times as much as the generated chlorine gas, the concentration of chlorine is diluted to ⅕. To maintain the chlorine concentration at a certain level even with such dilution in a configuration as FIG. 2, it Is desirable to increase the chlorine concentration in the functional water.

Functional water of a higher chlorine concentration (a chlorine solution) can be prepared easily by using reagents, in comparison with electrolysis, that is, it is easy to obtain functional water having a chlorine concentration 10 to 50 times higher than that of the functional water obtained by electrolysis, e.g., a functional water of residual chlorine concentration range of not less than 50 mg/L and not higher than 15000 mg/L, less, preferably not less than 50 mg/L and not higher than 3000 mg/L, and more preferably not less than 100 mg/L and not higher than 1500 mg/L. Although it is not agreed whether a solution having such a high residual chlorine concentration of remaining chlorine can be called functional water, in the present invention such solutions are also included in functional water. When functional water having such a high concentration of residual chlorine is prepared from reagents, it is better to mix, for example, hydrochloric acid and sodium hypochlorite are mixed in situ in a chlorine-generating tank (a FW aeration tank) rather than mixing reagents in advance.

Here, source water to be used for preparing functional water includes city water, river water, sea water etc., of which pH is usually between 6 and 8 and the chlorine concentration is less than 1 mg/L utmost. Thus, such source water by itself cannot decompose chlorinated organic compounds as mentioned above As discussed below, as long as the chlorine concentration in the mixed gas can be achieved, functional water is not limited to the above described functional water.

<Concentration of Chlorine Gas and Means for Generating Chlorine Gas>

From all of the above described functional water, it is possible to generate chlorine gas that is needed to decompose the pollutant. As a chlorine-containing gas, one can use chlorine-containing air which is obtained by passing air through functional water. In one embodiment of the present invention, this gas is mixed with a gas to be decomposed and then photo-irradiated to decompose the pollutant.

Alternatively, a mixture of chlorine-containing gas and a gas to be decomposed can be obtained by passing pollutant-containing air instead of air through functional water. In this case, a mixed gas of relatively high chlorine concentration can be obtained.

It does not matter that the air to be passed through the functional water or to be blown on the surface of the functional water contains the pollutant, that is, it may be the air obtained by aerating contaminated ground water etc. However, in this case, care should be taken because the pollutant may partly dissolves into functional water. In such a case, it is desirable to provide means for irradiating the drained functional water with light.

Concerning the mixing ratio of the gas to be decomposed and the chlorine-containing gas, the gaseous chlorine concentration is preferably not lower than 5 ppm and not higher than 1000 ppm. The decomposition efficiency of the gaseous pollutant to be decomposed becomes high, especially when the gaseous chlorine concentration in the gas mixture is between 20 ppm and 500 ppm, more preferably between 80 ppm and 300 ppm, though depending upon the concentration of the pollutant.

As described above, such gaseous chlorine can be generated and supplied by electrolysis or by using chemicals. In addition, chlorine gas of desired concentration can be directly obtained by diluting concentrated chlorine gas in a chlorine gas bomb, a chlorine gas cartridge or the like. That is, the best method can be chosen from these methods according to the conditions, so long as the chlorine concentration in the gas mixture is in the range as described above.

So far, only chlorine gas has been described as the gas for decomposition, but other halogen gases can be used so long as they can generate radicals by light-irradiation.

<Light-irradiating Means>

The light-irradiation means that can be used in the present invention irradiates light of, preferably 300 to 500 nm in wavelength, more preferably 350 to 450 nm in wavelength. Concerning the intensity of irradiation to a mixture of chlorine gas and the target substance to be decomposed with a light, for example, from a light source with a peak wavelength of 365 nm, an intensity of several hundreds $\mu W/cm^2$ (as measured in a wavelength range between 300 nm and 400 nm) Is sufficient for decomposing the target substance in practical applications.

Either natural light (e.g., sun light) or artificial light (light from a mercury lamp, a black lamp or a color fluorescent lamp, short wavelength (<500 nm) light-emitting diode etc.) can be used.

As shown in FIG. 1, when the used chlorine-containing water is drained off, the drainage may be light-irradiated. In this case, irradiation means of the above-described wavelength, intensity, light source is desirably used.

<Reaction Tank>

Any form may be used to physically limit the treatment region where the decomposition treatment is carried out. As mentioned above, purification reaction proceeds without the light having a short wavelength of 300 nm or below. Thus, glass, plastics or the like not permitting such light can be used.

Thereby it is possible to constitute an inexpensive system.

Gas discharged from the reaction tank after light-irradiation treatment may be introduced into the second reaction tank of a constitution similar to the first reaction tank to be light-irradiated again. It is also possible to arrange reaction tanks in tandem until the gas reaches to a sufficiently purified level.

Because of the wider choice of the material, the degree of freedom in forms and shapes of the reaction tank is also increased. For example, a bag-like container such as an air bag can be used as a reaction tank.

Any form of a bag-shaped reaction tank can be used as long as light needed for the decomposition 300 nm or more, or 350 nm or more in wavelength) can pass through It. In particular, TEDLAR bag using polyvinyl fluoride film (TEDLAR: trade name of Du Pont Co., Ltd.) or fluororesin bag or the like are suitable in view of gas adsorption and permeability.

By using a bag as a reaction tank, not only the apparatus becomes cheap, but also the installation in the treatment site, movement and removal of apparatus become easy because of the light weight.

Further, by adopting bellows constitution, the reaction tank can be easily folded.

Because it is easy to change the size in conformity with decomposition conditions for the reaction tank of bellows-like or bag-like constitution, the most suitable retention time (reaction time) can be variably set according to the conditions.

<Means for Aerating Functional Water and Contaminated Water>

To aerate water with air, or to aerate functional water with pollutant-containing gas and/or aeration gas, an air diffuser (bubbler) can be used. It may be an ordinary air-diffuser used for blowing a gas through a liquid, but desirably used is a diffuser that can produce bubbles having a surface area sufficient to set chlorine free.

It is desirable that the diffuser is made of a material not reactive with the components in functional water. For example, usable diffusers include porous diffusion plates made of sintered glass, porous ceramics, sintered SUS316, or a net of fibrous SUS316, and spargers made of pipes of glass, SUS316 or the like.

<Main Reaction Site in the Decomposition Process>

In one embodiment of the present invention, chlorine-containing air required for decomposition is generated by passing air through functional water. This part supplies chlorine gas that is indispensable for decomposition. Subsequent gaseous reaction in a tank for treatment and decomposition is the main part of decomposition reaction.

For this reason, when the chlorine generation unit and the decomposition reaction unit are integrated into one unit, the ratio of the gas phase part and liquid phase part exerts a strong influence on the decomposition capacity. That is, if the volume of functional water is increased to increase the chlorine supply, the gas phase part is decreased decreasing the decomposition reaction site. On the other hand, if the gas phase part is increased to increase the reaction site, decomposition reaction proceeds rapidly, but this means decrease of the liquid phase, resulting in the decrease of chlorine supply.

When chlorine-containing gas generation and the decomposition reaction are carried out in one treatment unit, the percentage of the liquid phase in the treatment unit is better to be from 5% to 30%, desirably from 10% to 20%, although many factors such as the aeration rate and the feeding rate of functional water may affect. When these reactions are carried out in separate units, the volume ratio of the tanks is desirably about 1:2 to 1:9.

<Decomposition Reaction Mechanism>

The inventors of the present invention have already found that the decomposition of a chlorinated organic compound proceeds when the compound is light-irradiated in the presence of chlorine gas, but the reaction mechanism is mostly unknown. It is already known that when irradiated with light of a specific wavelength range, chlorine dissociates and generates radicals. Thus, in the present invention, it is considered that chlorine radicals are generated from chlorine by light-irradiation to react with the compound to be decomposed cleaving the bond.

For example, when functional water is generated around the anode by electrolyzing water containing an electrolyte such as sodium chloride, it contains hypochlorous acid or hypochlorous acid ion. Since such functional water containing hypochlorous acid or hypochlorous acid ion is acidic, it is considered that chlorine increases in this functional water. When the functional water is light-irradiated, chlorine radicals are generated from chlorine by excitation, which cause the decomposition reaction of pollutant.

When functional water is aerated, chlorine in the functional water passes into the gas phase. Chlorine and the pollutant are mixed in the gas phase. When this mixed gas is light-irradiated, chlorine is excited to form radicals and the decomposition reaction of the pollutant proceeds. On this account, it is assumed that most of the decomposition proceeds in gas phase than in liquid phase.

Furthermore, oxygen is essential in the reaction of the present invention, but the oxygen radicals produced by the electrolysis of sodium chloride and water and oxygen in the air are sufficient for the reaction.

As above, descriptions have been made mainly about the purification of ground water, the present invention can be also applied to the purification of any water contaminated with pollutants including the above described chlorinated organic compounds.

For example, the present invention is suitable for purifying the desorption water that is produced in regenerating the activated carbon used in the purification process of contaminated gas to adsorb and remove the pollutant.

EXAMPLE

In the following, the present invention will be described concretely with reference to examples.

Example 1

Contaminated water was purified by using a purifying apparatus for contaminated water shown in FIG. 2.

Contaminated water 1 contaminated with chlorinated organic compounds was fed to a stainless steel aeration tank 2.

Pollutants and their concentrations in the contaminated water were as follows.

| | |
|---|---|
| Trichloroethylene | 22.3 mg/kg |
| Tetrachloroethylene | 5.7 mg/kg |
| cis-Dichloroethylene | 2.0 mg/kg |
| 1,1-Dichloroethylene | 0.5 mg/kg |

The contaminated water in the aeration tank 2 was aerated by air fed from the pump 5 to desorb the pollutant into the gas phase. Then, the pollutant-containing air was led to a treatment tank 3 and was mixed with chlorine-containing air fed from a FW aeration tank 14 in the treatment tank 3.

In this Example, a strongly acidic functional water generating apparatus (OASYS Bio HALF ADE-61: tradename, a product of Asahi Glass Engineering) was used to produce functional water having a pH of 2.1, an oxidation-reduction potential of 1,150 mV and a residual chlorine concentration of 50 mg/L.

The inside of the treatment tank 3 was irradiated with black light emitted from light irradiation means 4 (Black Light Fluorescent Lamp FL20BLB: tradename, a product of Toshiba, 20 W). The treatment tank 3 is a glass column not transmit the light having a wavelength of 300 nm or shorter.

The concentrations of pollutants in the gas discharged from discharge pipe 7 were determined by gas chromatography using a gas chromatograph with an FID detector (GC-14B: a product of Shimadzu Seisakusho, DB-624 column: a product of J & W Co., Ltd.) to find that all pollutants were under the detection limit. The treated contaminated water was immediately taken into a tank containing n-hexane and stirred for 10 minutes. Then, the n-hexane layer was collected and subjected to ECD gas chromatography. None of the pollutants were present at a concentration higher than 0.01 mg/kg.

As a result, it was confirmed that the contaminated water was purified and pollutants released from the contaminated water were decomposed.

Example 2

Contaminated water was purified by using a purifying apparatus for contaminated water shown in FIG. 3.

Contaminated water 1 contaminated with chlorinated organic compounds was fed to a stainless steel aeration tank 2.

Pollutants and their concentrations in the contaminated water were as follows.

| | |
|---|---|
| Trichloroethylene | 102.6 mg/kg |
| Tetrachloroethylene | 15.7 mg/kg |
| cis-Dichloroethylene | 20.2 mg/kg |
| 1,1-Dichloroethylene | 12.5 mg/kg |

The pollutant-containing air and chlorine-containing air were mixed in the same manner as in Example 1 and the treatment tank 3 was light-irradiated with black light rays by a light-irradiation means 4. The pollutant concentrations were measured in the same manner as in Example 1. As a result, the pollutant concentrations in the discharge pipe 7 were as follows. From these results, pollutants were still present there.

| | |
|---|---|
| Trichloroethylene | 17.2 ppm |
| Tetrachloroethylene | 1.1 ppm |
| cis-Dichloroethylene | 0.9 ppm |
| 1,1-dichloroethylene | 0.5 ppm |

In this Example, the discharged air still containing the pollutants as above was fed to a second treatment tank 16 and was subjected to purification treatment again with the use of a black light of photo irradiation means 17. This time, chlorine-containing air was fed to the second treatment tank 16 using a pump 18 to adjust the chlorine concentration in the treatment tank to about 50 ppm.

The pollutant concentrations in a gas discharged from a discharge pipe 19 were determined by the same method as in Example 1. All pollutants were under the detection limits and the pollutant concentrations in the treated contaminated water were 0.01 mg/kg or below. Thus, it was confirmed that contaminated water was purified and pollutants released from the contaminated water were decomposed.

Example 3

Contaminated water was purified with an apparatus shown in FIG. 4.

Although the apparatus used in this example is almost the same as that used in Example 1 except that part of pollutant-containing air fed from the aeration tank 2 was used to aerate the FW aeration tank 14 with the valve 20, where in Example 1, air was fed to the FW aeration tank 14 by the pump 15.

Properties of functional water, light-irradiation means, measurement methods of pollutants in air discharged from the discharge pipe 7 and others are the same as in Example 1.

When the pollutant concentrations in the gas discharged from the discharge pipe 7 were measured by the same method as in Example 1, all pollutants were below the detection limits and the pollutant concentrations in the treated contaminated water were all 0.01 mg/kg or below. Thus, it was confirmed that contaminated water was purified and pollutants released from the contaminated water were decomposed.

Example 4

Contaminated water desorbed from activated carbon was purified by using the purifying apparatus shown in FIG. 2.

Pollutant-adsorbing activated carbon that had been recovered from an adsorption column filled with activated carbon was used. The activated carbon was desorbed with steam and resultant desorbed contaminated water 1 that contains chlorinated organic compounds was fed to the stainless steel aeration tank 2.

Polluting components and their concentration in the contaminated water were as follows.

| | |
|---|---|
| Trichloroethylene | 72.3 mg/kg |
| Tetrachloroethylene | 5.1 mg/kg |
| cis-1,2-Dichloroethylene | 12.3 mg/kg |
| 1,1-Dichloroethylene | 10.5 mg/kg |

The contaminated water fed to the aeration tank 2 was aerated by air fed from the pump 5 to desorb pollutants into the gas phase. Then, the pollutant-containing air was led to the treatment tank 3 and mixed with chlorine-containing air fed from the FW aeration tank 14.

In this Example, a strongly acidic functional water generating apparatus (OASYS Bio HALF ADE-61: tradename, a product of Asahi Glass Engineering) was used to produce functional water having a pH of 2.1, an oxidation-reduction potential of 1,150 mV and a residual chlorine concentration of 50 mg/L.

The inside of the treatment tank 3 was irradiated with black light emitted from light irradiation means 4 (Black Light Fluorescent Lamp FL20BLB: tradename, a product of Toshiba, 20 W). The treatment Lank 3 is a glass column not transmit the light having a short wavelength of 300 nm or shorter.

The concentrations of pollutants in the gas discharged from discharge pipe 7 were determined by gas chromatography using a gas chromatograph with an FID detector (GC-14B: a product of Shimadzu Seisakusho, DE-624 column: a product of J & W Co., Ltd.) to find that all pollutants were under the detection limit. The treated contaminated water was immediately taken into a tank containing n-hexane and stirred for 10 minutes. Then, the n-hexane layer was collected and subjected to ECD gas chromatography. None of the pollutants were present at a concentration higher than 0.01 mg/kg.

As a result, it was confirmed that the contaminated water was purified and pollutants released from the contaminated water were decomposed.

Example 5

An experiment was carried out in the same manner as in Example 4, except that the FW aeration tank 14 in FIG. 2 was replaced with an chlorine gas cylinder.

Chlorine gas from the cylinder was fed to the treatment tank 3 to be mixed with the pollutant-containing air therein.

The inside of the treatment tank 3 was irradiated with black light emitted from light irradiation means 4 (Black Light Fluorescent Lamp FL20BLB: tradename, a product of Toshiba, 20 W). The treatment tank 3 is a glass column not transmit the light having a wavelength of 300 nm or shorter.

The concentrations of pollutants in the gas discharged from discharge pipe 7 were determined by gas chromatography using a gas chromatograph with an FID detector (GC-14B: a product of Shimadzu Seisakusho, DB-624 column: a product of J & W Co., Ltd.) to find that all pollutants were under the detection limit. The treated contaminated water was immediately taken into a tank containing n-hexane and stirred for 10 minutes. Then, the n-hexane layer was collected and subjected to ECD gas chromatography. None of the pollutants were present at a concentration higher than 0.01 mg/kg.

As a result, it was confirmed that the contaminated water was purified and pollutants released from the contaminated water were decomposed, even when the FW aeration tank is replaced with a chlorine gas cylinder.

Example 6

In this Example, a light source having a wavelength peak at 254 nm (germicidal lamp) was used as the light-irradiation means instead of the light source having a wavelength peak at 300 nm to 500 nm used in Examples 1 to 5, That is, as the light-irradiation means in the purifying apparatus shown in FIG. 1, a germicidal lamp sheathed in a silica tube is installed in the treatment tank 3 to irradiate UV light instead of black light. Next, the decomposition experiment was carried out under two conditions: the aeration tank 2 was filled with functional water to feed chlorine-containing air to the treating tank, or the aeration tank 2 was filled with pure water to feed air to the treatment tank, to compare the decomposition efficiency between these conditions. As a result, under UV irradiation, the decomposition capacity was 2 to 20 times higher when the chlorine gas was fed. This effect is conspicuous in decomposing low concentration pollutant of 10 ppm or less, further increasing decomposition capacity.

As described above, the present invention of apparatus and method for purifying contaminated water enables essential decomposition of pollutants, especially halogenated aliphatic hydrocarbon compounds contained in contaminated water at low cost, not merely moving the pollutant from one medium to another medium, e.g., from the contaminated water to activated carbon.

Moreover, the chlorine-containing gas generation device of the present invention can generate a chlorine-containing gas with high controllability and stability.

In addition, the contaminated gas decomposition apparatus of the present invention provided with this chlorine-containing gas generation device can decompose contaminated gas with high controllability and stability.

What is claimed is:

1. A purifying apparatus for contaminated water comprising:
   an aerator in which a contaminated water containing a pollutant is aerated with a gas to generate a gas containing the pollutant;
   a chlorine-containing gas generator that generates a chlorine-containing gas;
   a mixing section where the pollutant-containing gas generated from the contaminated water and the chlorine-containing gas generated in the chlorine-containing gas generator are mixed; and
   light-irradiation means for irradiating the mixed gas with light to decompose the pollutant contained in the mixed gas.

2. The purifying apparatus according to claim 1, wherein the apparatus is constituted such that the aerator is in a well.

3. The purifying apparatus according to claim 1, wherein the chlorine-containing gas generator is a unit using a chlorine cylinder.

4. The purifying apparatus according to claim 1, wherein the chlorine-containing gas generator comprises a means for contacting air with a functional water so that a chlorine-containing gas is generated by aeration.

5. The purifying apparatus according to claim 4, wherein the chlorine-containing gas generator comprises a water tank, means for generating functional water, means for introducing air into the water tank, means for discharging a chlorine-containing gas generated, and means for discharging the functional water used for generating a chlorine-containing gas.

6. The purifying apparatus according to claim 5, wherein the means for generating functional water comprises a water tank, means for feeding an electrolyte-containing water into the water tank, and a pair of electrodes and a power source to apply an electric potential to the electrolyte-containing water in the water tank.

7. The purifying apparatus according to claim 4, wherein the means for generating functional water comprises a water tank, means for feeding an aqueous solution of a hypochlorite into the water tank, and means for feeding at least either of an inorganic acid and an organic acid into the water tank.

8. The purifying apparatus according to claim 4, wherein the chlorine-containing gas generator comprises means for sending air to the surface of the functional water.

9. The purifying apparatus according to claim 8, wherein the functional water is generated near an anode of a pair of electrodes by electrolyzing an electrolyte solution in a water tank, the chlorine-containing gas generator comprises means for introducing air near the anode in the water tank.

10. The purifying apparatus according to claim 4, wherein the chlorine-containing gas generator comprises means for contacting small droplets of the functional water with air.

11. The purifying apparatus according to claim 10, wherein the means for contacting is a nozzle to spray the functional water.

12. The purifying apparatus according to claim 4, wherein the chlorine-containing gas generator comprises means for aerating the functional water with air.

13. The purifying apparatus according to claim 12, wherein means for aerating the functional water with air is a bubbler.

14. The purifying apparatus according to claim 12, wherein the functional water is generated near an anode of a pair of electrodes by electrolyzing an electrolyte solution in a water tank, the chlorine-containing gas generator comprises means for introducing air near the anode in the water tank.

15. The purifying apparatus according to claim 4, further comprising a means for introducing outside air that does not contain the pollutant.

16. The purifying apparatus according to claim 4, further comprising a means for directly introducing the pollutant-containing gas into the chlorine-containing gas generator.

17. The purifying apparatus according to claim 4, wherein the purifying apparatus further comprises means for irradiating the functional water that was used for generating a chlorine-containing gas and discharged from the chlorine-containing gas generating unit.

18. The purifying apparatus according to claim 4, wherein the chlorine-containing gas generator and the mixing section are integrated to constitute a decomposition treatment tank, where a chlorine-containing gas generation region is present at the bottom of the treatment tank, and occupies 5 to 30% by volume of the treatment tank.

19. The purifying apparatus according to claim 1, wherein the mixing section is bag-shaped variable in shape and volume, and mixing is carried out in the mixing section.

20. The purifying apparatus according to claim 19, wherein the bag-shaped mixing section has a bellows constitution.

21. The purifying apparatus according to claim 19, wherein the purifying apparatus has an outer container covering the bag-shaped mixing section.

22. The purifying apparatus according to claim 21, wherein the irradiation unit is provided between the bag-shaped mixing section and the outer container.

23. The purifying apparatus according to claim 1, further comprising means for directly sending at least part of the pollutant-containing gas obtained by aerating the contaminated water into the mixing section.

24. The purifying apparatus according to claim 1, wherein the light irradiated from the light-irradiation unit contains light of a wavelength range of 300 to 500 nm.

25. The purifying apparatus according to claim 1, wherein irradiation is carried out at a light intensity of 10 $\mu$W/cm$^2$ to 10 mW/cm$^2$.

26. The purifying apparatus according to any one of claims 1, 2–6, 7, 8–15, 16, 17–23, 24 and 25, wherein the purifying apparatus further comprises a second mixing section into which a gas discharged from the first mixing section after treatment is introduced; a second light-irradiation means to irradiate the gas in the second mixing section: and discharging means for discharge the further treated and decomposed gas from the second mixing section.

27. The purifying apparatus according to claim 1, wherein the apparatus further comprising an exhaust unit to exhaust a decomposed gas from said section.

28. A method for purifying contaminated water comprising the steps of:
   obtaining a pollutant-containing gas by aerating a contaminated water containing a pollutant;
   obtaining a chlorine-containing gas;
   mixing the pollutant-containing gas and the chlorine-containing gas to form a mixed gas;
   decomposing the pollutant in the mixed gas by irradiating with light the mixed gas introduced into a treatment region in a treatment tank; and
   discharging the mixed gas after decomposition treatment from the treatment region.

29. The purifying method according to claim 28, wherein the step of introducing a chlorine-containing gas is a step of generating a chlorine-containing gas by bringing air into contact with a functional water that can generate a chlorine-containing gas by aeration.

30. The purifying method according to claim 29, wherein the step of generating a chlorine-containing gas comprises the steps of:
   generating the functional water;
   supplying the functional water into a water tank;
   introducing air into the water tank to generate a chlorine-containing gas;
   discharging the chlorine-containing gas; and
   draining off the functional water used for generating a chlorine-containing gas.

31. The purifying method according to claim 30, wherein the step of generating the functional water comprises the steps of:
   feeding a water containing an electrolyte into a water tank; and
   applying an electric potential to the electrolyte-containing water in the water tank.

32. The purifying method according to claim 30, wherein the step of generating a functional water comprises the steps of:
   feeding an aqueous solution of a hypochlorite into a water tank; and
   feeding at least one of an inorganic acid and an organic acid into the water tank.

33. The purifying method according to claim 30, wherein the step of generating a chlorine-containing gas from a functional water is a step of blowing air to the surface of the functional water.

34. The purifying method according to claim 30, wherein the step of generating a chlorine-containing gas from a functional water is a step of bringing small droplets of the functional water into contact with air.

35. The purifying method according to claim 30, wherein the step of generating a chlorine-containing gas is a step of aerating the functional water with air.

36. The purifying method according to claim 35, wherein the step of aerating the functional water is carried out by bubbling.

37. The purifying method according to claim 29, wherein the purifying method comprises a further step of irradiating with light the functional water that was used in the step of generating a chlorine-containing gas.

38. The purifying method according to claim 29, wherein a chlorine generating region where the step of generating a chlorine containing gas, and a treatment region where the step of decomposing the pollutant is carried out are integrated in one treatment tank, where a chlorine-containing gas generation region is present at the bottom of the treatment tank, and occupies 5 to 30% by volume of the treatment tank.

39. The purifying method according to claim 28, wherein at least part of a pollutant-containing gas obtained by the step of aerating the pollutant-containing water is directly sent into the treatment region.

40. A purifying apparatus for contaminated water, comprising:

an aerator in which a contaminated water containing a pollutant is aerated with a gas to generate a gas containing the pollutant;

a gas generator that generates a gas that generates radicals under light-irradiation;

a mixing section where the pollutant-containing gas generated from the contaminated water and the gas generated in the gas generator are mixed to obtain a mixed gas; and a light-irradiator that irradiates the mixed gas with light to decompose the pollutant contained in the mixed gas wherein the gas used to aerate the contaminated water is different from the gas that generates radicals under light-irradiation.

41. A method for purifying contaminated water comprising the steps of:

obtaining a pollutant-containing gas by aerating a contaminated water containing a pollutant;

obtaining a gas that generates radicals under light-irradiation;

mixing the pollutant-containing gas and the gas that generates radicals to form a mixed gas; and decomposing the pollutant in the mixed gas by irradiating with light the mixed gas wherein the gas used to aerate the contaminated water is different from the gas that generates radicals under light-irradiation.

42. An apparatus for purifying contaminated water, comprising:

a gas supplier supplying a first gas into a contaminated water to generate a second gas containing a pollutant from the contaminated water;

a mixing section to get a mixed gas by mixing the second gas and a third gas that generates radicals under light-irradiation; and a light-irradiation unit that irradiates light to the mixed gas wherein the first gas is different from the third gas.

43. A method for purifying contaminated water, comprising the steps of:

supplying a first gas into a contaminated water to generate a second gas containing a pollutant from the contaminated water;

mixing the second gas and a third gas that generates radicals under light-irradiation to form a mixed gas; and irradiating light to the mixed gas to decompose the pollutant in the mixed gas wherein the first gas is different from the third gas.

* * * * *

UNITED STATES PATENT AND TRADEMARK OFFICE
CERTIFICATE OF CORRECTION

PATENT NO. : 6,599,431 B2
DATED : July 29, 2003
INVENTOR(S) : Masahiro Kawaguchi et al.

It is certified that error appears in the above-identified patent and that said Letters Patent is hereby corrected as shown below:

<u>Title page,</u>
Item [56], References Cited, U.S. PATENT DOCUMENTS, insert
-- 4,941,957    7/1990        Zeff et al. ...204/157.3
   5,470,478    11/1995       Leva ………..210/634 --.
Item [57], ABSTRACT,
Line 7, "may" should read -- may be --.

<u>Column 1,</u>
Line 23, "cause" should read -- causing --.

<u>Column 5,</u>
Line 1, "an" should read -- a --.

<u>Column 8,</u>
Line 38, "dissolves" should read -- dissolve --.

<u>Column 9,</u>
Line 3, "Is" should read -- is --.

<u>Column 10,</u>
Line 16, "affect." should read -- affect the reaction. --; and
Line 25, "not" should read -- that does not --.

<u>Column 13,</u>
Lines 13 and 41, "not" should read -- that does not --.

<u>Column 15,</u>
Line 67, "claims 1, 2-6, 7, 8-15, 16, 17-23, 24 and 25," should read -- claims 1-25, --.

UNITED STATES PATENT AND TRADEMARK OFFICE
CERTIFICATE OF CORRECTION

PATENT NO.     : 6,599,431 B2
DATED          : July 29, 2003
INVENTOR(S)    : Masahiro Kawaguchi et al.

It is certified that error appears in the above-identified patent and that said Letters Patent is hereby corrected as shown below:

Column 16,
Line 15, "discharge" should read -- discharging --; and
Line 8, "comprising" should read -- comprises --.

Signed and Sealed this

Ninth Day of March, 2004

JON W. DUDAS
*Acting Director of the United States Patent and Trademark Office*